June 20, 1939.  E. L. BALDESCHWIELER  2,163,232
MANUFACTURING BORON FLUORIDE
Filed April 28, 1937   2 Sheets-Sheet 1
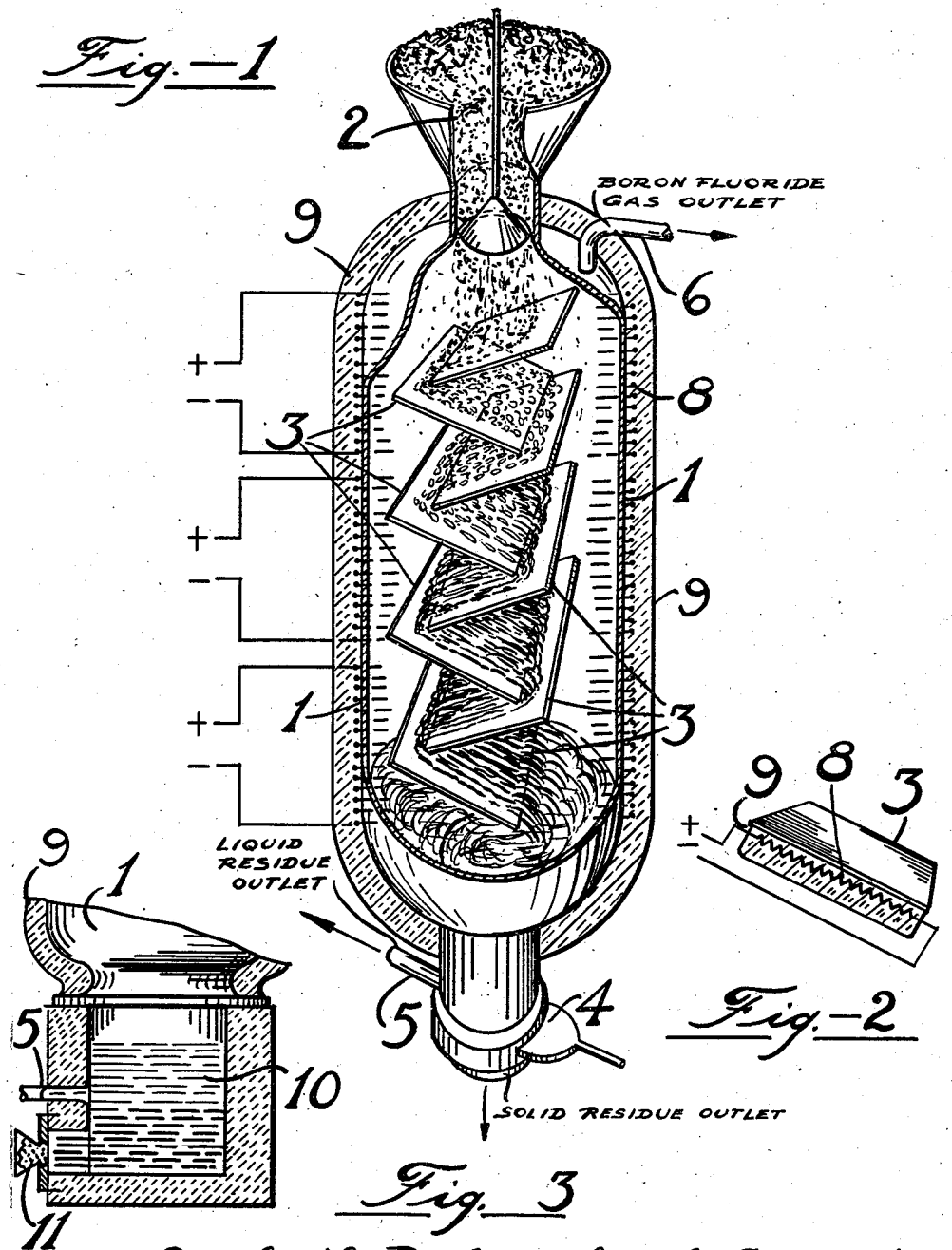
Emile L. Baldeschwieler Inventor
By P. L. Young Attorney

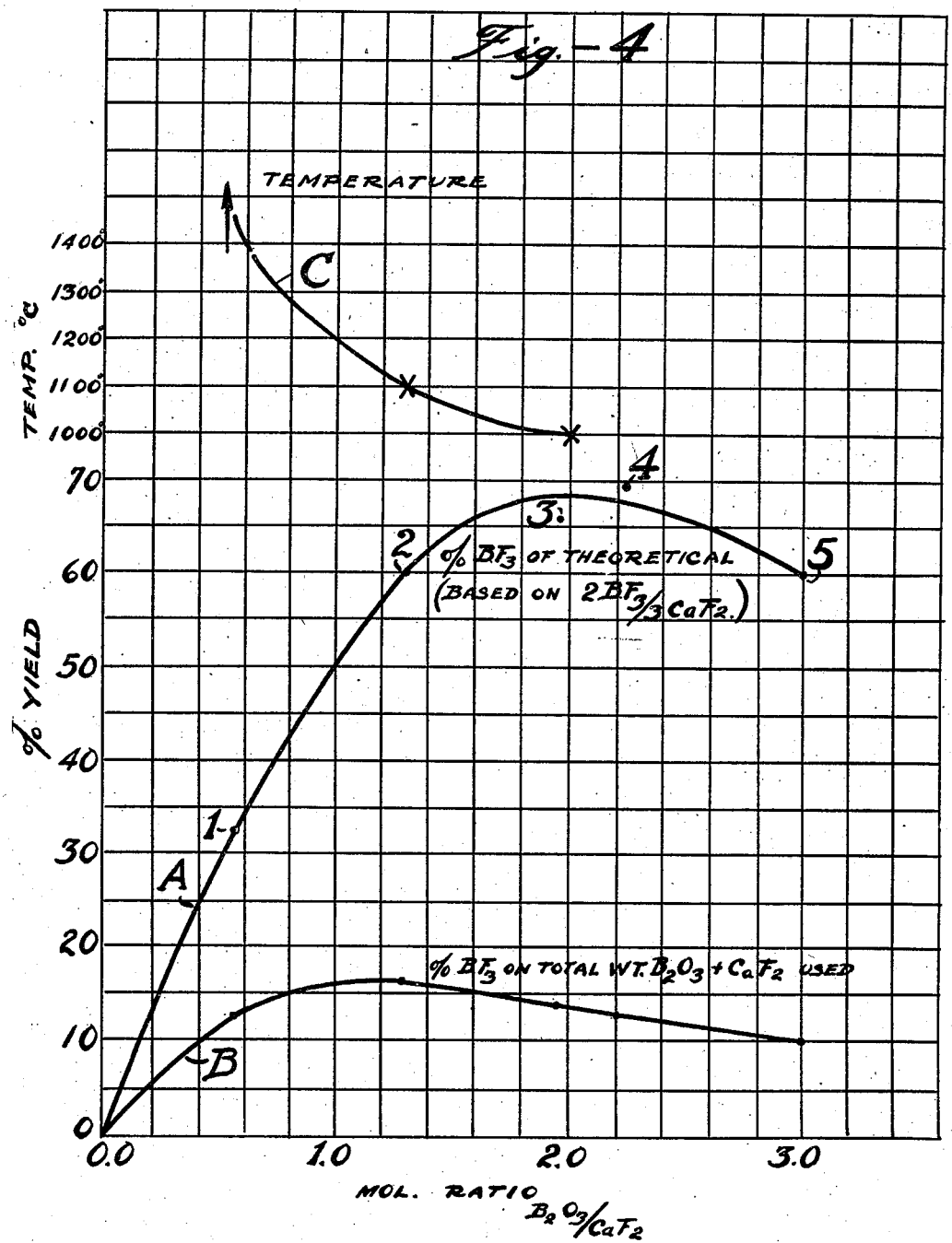

Patented June 20, 1939

2,163,232

UNITED STATES PATENT OFFICE 2,163,232

MANUFACTURING BORON FLUORIDE

Emile L. Baldeschwieler, Cranford, N. J., assignor to Standard Oil Development Company, a corporation of Delaware Application April 28, 1937, Serial No. 139,502

5 Claims. (Cl. 23—205)

This invention relates to an improved method of manufacturing boron fluoride and more particularly to a dry method of making same.

The chief method used heretofore commercially for manufacturing boron fluoride is the treatment of a mixture of boric oxide and fluorspar with sulfuric acid, but this method has the great disadvantage of being a wet process involving the difficulties and inconveniences of using very corrosive materials, as well as the consumption of a large amount of sulfuric acid. As a result, the process is expensive. Many years ago a dry process was proposed by Gay-Lussac, namely, to heat boric oxide with twice its weight of fluorspar (calcium fluoride) to white heat, but this process is not practical due to the high temperature required and the products are not fusible at reasonably low temperatures for practical commercial operations.

According to the present invention, it has been discovered that a dry process involving the use of boric oxide and calcium fluoride can be made practical by greatly increasing the proportion of boric oxide used so that a much lower temperature can be used which can be obtained practically and commercially; it is believed that the formation of low-melting constituents in the residual products left upon liberation of the boron fluoride helps to form a liquid mass or slag and thereby facilitates the liberation of the boron fluoride.

Broadly the invention comprises using a ratio of boric oxide to calcium fluoride ($B_2O_3:CaF_2$) greater than 0.8, or between the approximate limits of 0.8 and 3.0, and preferably between the approximate limits of 1.0 and 2.0. By this process, relatively large volumes of boron fluoride gas are obtained at a relatively low cost, particularly inasmuch as means are provided for recovering useful constituents, chiefly boric oxide, from the residual slag. Furthermore, the boron fluoride produced by this process is of a high degree of purity, being substantially free from $SiF_4$, $HBF_4$, and $SO_3$, which are impurities normally encountered in the wet or acid process referred to above.

The invention may be carried out in any suitable apparatus, such as a vertical stationary furnace (like a blast furnace used for making iron) which may or may not have inclined plates in it as described in conjunction with the accompanying drawings, or a slightly inclined horizontal rotary kiln, either of which may be used for continuous operation, or any type of retort which may be used for batch operation. The furnace may be freed of oxygen at the start of operations, by blowing with nitrogen or other inert gas or with some impure or dilute boron fluoride.

In the accompanying drawings, Figure 1 shows a cross-section of a vertical stationary furnace adapted to be used for the continuous production of boron fluoride.

Figure 2 is a detail in perspective of an alternative heating arrangement by which the individual plates are heated instead of the furnace walls.

Figure 3 is a detail in vertical section of an alternative construction of the bottom of the furnace.

Figure 4 is a graph or chart showing the relation of per cent yield of boron fluoride and temperature to the ratio $B_2O_3:CaF_2$.

Referring to Figure 1 in the accompanying drawings, a mixture of boric oxide and calcium fluoride (preferably in fine granular form or in powdered form as would be obtained by pulverizing in a ball mill to a fineness of 80 to 90% passing about 100 mesh) is fed into the top of furnace 1 through a convenient hopper feeding device 2 so that the mixture will descend slowly on suitable inclined plates 3 with provision for discharging solid or liquid residues from the bottom of the furnace either through the bottom opening 4 or side tap hole 5. The interior walls of the furnace 1 and the plates 3 may be made of iron or steel, or other suitable alloys, although these materials would not be practical at the high temperatures required by the dry process proposed long ago. The liberated boron fluoride gas is withdrawn through outlet 6 near the top of the furnace. The furnace may be heated either by means of combustion gases passing through a surrounding chamber 7 (not shown) or it may be heated by suitable electric rheostat elements 8, such as nickel-chromium resistance wires or carbon resistance electrodes.

Various modifications or alternative types of equipment may be used in carrying out the invention; for instance, if desired, the pulverized mixture may be satisfactorily used in the form of pills or briquets. Also, if desired, means may be provided for preheating the raw materials by suitable countercurrent heat exchangers, using the heat from either the boron fluoride gas or the liquid or solid residues or both.

Figure 2 shows an alternative heating arrangement whereby the individual inclined plates 3 are heated with suitable electric resistance heaters on their under surface, thereby avoiding the necessity of relying on a radiation of heat from the walls of the furnace 1 to heat the plates.

By this arrangement of Figure 2, the liberated gas may, if desired, be confined to a smaller space instead of permeating all of the space between the plates and the furnace walls.

Figure 3 shows an alternative construction of the bottom of the furnace whereby liquid reaction products in the form of a molten slag are allowed to accumulate in a slag pit 10 during operation of the process and periodically discharged through the tap hole 5, in a manner similar to that used in removing the slag from an iron blast furnace. The larger lower opening or manhole 11 may be used for draining or cleaning out the slag when desired.

The residues obtained from the bottom of the furnace and consisting chiefly of calcium monoborate, $CaO.B_2O_3$, or a eutectic mixture thereof with calcium di-borate, $CaO.2B_2O_3$, and also containing some fluorine, possibly in the form of calcium fluoborate, $Ca(BF_4)_2$, may be treated with a suitable dilute mineral acid, such as sulfuric acid or hydrochloric acid, for the recovery of boric oxide. For instance, the slag, after pulverizing, dissolves completely in 10% HCl at 160° F. in about 20 hours. Commercially the use of sulfuric acid is preferable, both because it is cheaper and also because the resulting sulfate is practically insoluble and can be separated by settling or filtration, the boric acid then being concentrated and/or crystallized out from the liquor. To facilitate the recovery, the hot molten slag may be granulated by pouring it into cold water and further pulverizing if desired. Also the slag may be used for manufacturing glass.

In carrying out the present invention, the operation of the furnace is so adjusted that the mixture of boric oxide and calcium fluoride is heated for a period of time of approximately 5 to 30 minutes, ordinarily 10 minutes being sufficient if the heating means used is very efficient. In any case, the heating should be continued until substantially no more boron fluoride is evolved.

Although it is not desired to limit the invention to any particular theories as to the mechanism of the reactions involved, the following tentative explanations are advanced in order to emphasize some of the advantages of the present process over the process previously proposed by Gay-Lussac. One of the most important advantages of the present invention is the use of an operating temperature which is feasible commercially, namely, between the approximate limits of 900–1100° C. or perhaps 1200° C., whereas the prior process required a temperature substantially in excess of 1400° C. which is not practical commercially for this type of process. Another advantage of the present process is that after all the boron fluoride has been evolved, the amount of fluorine left in a chemically combined form in the residue is very much less than (substantially less than ½ as much as) in the prior method. This is very important commercially inasmuch as this residual fluorine is apparently combined in such a chemically stable form that it cannot practically be recovered. It is believed that the compound formed is calcium fluoborate, having the formula $Ca(BF_4)_2$. On the other hand, with the much larger ratio of $B_2O_3:CaF_2$ used according to the present invention, as compared to the low ratio used in the Gay-Lussac process, a residual product or slag is obtained from which it is practical to recover a substantial proportion of the $B_2O_3$ contained therein; whereas in the residue from the other process, the proportion of $B_2O_3$ present is so small that a tremendously large amount of relatively valueless lime and relatively stable and unrecoverable fluorine compounds must be handled that a process for recovering the small amount of $B_2O_3$ would not be practical. It is believed that the residue from the prior process contains enough lime to form a tri-calcium borate having the formula $3CaO.B_2O_3$ and that under those conditions no calcium borate, $CaO.B_2O_3$, could be or would be formed. According to the present invention, it is believed desirable to use a sufficiently high ratio of $B_2O_3:CaF_2$ that the slag residue will contain a substantial amount of calcium borate, $CaO.B_2O_3$, and if desired, even some calcium di-borate, $CaO.2B_2O_3$.

For the sake of further illustrating the operation of the present invention, the following table of experimental data is given which may be read in connection with the chart shown in Figure 4 of the drawings.

| Test No. | Ratio $B_2O_3:CaF_2$ | | Yield | |
|---|---|---|---|---|
| | Mol. | Wt. | Percent $BF_3$ (on $CaF_2$ used)* | G. $BF_3$ per 100 G. $B_2O_3+CaF_2$ |
| 1 | 0.57 | 0.51 | 31.8 | 12.20 |
| 2 | 1.30 | 1.16 | 59.8 | 16.10 |
| 3 | 1.96 | 1.76 | 65.5 | 13.80 |
| 4 | 2.22 | 2.00 | 69.1 | 13.40 |
| 5 | 3.01 | 2.69 | 59.5 | 9.35 |

*Calculated upon the theoretical amount obtainable based on the ratio $2BF_3:3CaF_2$.

From the above table and the accompanying chart in Figure 4, it is apparent that when the molar ratio of $B_2O_3:CaF_2$ is increased from 0.57, as used in the Gay-Lussac process, to substantially 1.0 or above, there is a great increase in the percentage of $BF_3$ obtained (see curve A in Figure 4), as calculated upon the theoretical amount obtainable based on the ratio of $2BF_3:3CaF_2$ according to the chemical reaction:

$$B_2O_3 + 3CaF_2 \rightarrow 2BF_3 + 3CaO$$

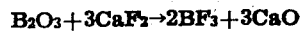

It is also apparent that the yield $BF_3$ based on the total weight of boric oxide and calcium fluoride used is also increased until (as shown in curve B in Figure 4) it reaches a maximum at a $B_2O_3:CaF_2$ ratio of 1.0 or 1.2, after which it gradually is reduced with further increases in the ratio of $B_2O_3:CaF_2$.

The optimum ratio of $B_2O_3:CaF_2$ to be used will lie approximately between the ratios indicated by the highest point in curve A and the highest point in curve B, in other words, between the approximate limits of 1.0 and 2.0.

Although curve C in Figure 4 is based on estimated figures only, it gives some idea of the great practical reduction in temperature which can be obtained by the use of the present invention.

It is not intended that the invention be limited to any theories given as to the mechanism of the operation of the invention, nor to the specific details which are given merely for the sake of illustration, but only by the appended claims in which it is intended to claim all novelty inherent in the invention as broadly as the prior art permits.

I claim:

1. Process of producing boron fluoride which comprises heating a mixture of boric oxide and calcium fluoride having a molar ratio of $B_2O_3:CaF_2$ in between the approximate limits of 0.8 to 3.0 and heating said mixture to a temperature within the approximate limits of 900 and 1200° C. to evolve a substantial amount of boron fluoride gas.

2. Process according to claim 1 in which the ratio of $B_2O_3:CaF_2$ is between the approximate limits of 1.0 and 2.0.

3. Process of producing boron fluoride which comprises heating calcium fluoride with a sufficient amount of boric oxide to obtain a molten reaction mixture at a temperature in the range of about 900 to 1200° C., in which range the optimum molar ratio of $B_2O_3:CaF_2$ is between the approximate limits 1.0 and 2.0 and reacting said molten reaction mixture to evolve a substantial amount of boron fluoride and leaving a non-gaseous residue containing a substantial amount of calcium mono-borate.

4. Process of producing boron fluoride which comprises comminuting boric oxide and calcium fluoride, mixing same in a molar ratio of $B_2O_3:CaF_2$ between the approximate limits of 1.0 and 2.0 and heating said mixture to a temperature between the approximate limits of 900° and 1200° C. until substantially no more boron fluoride gas is evolved from said mixture.

5. Process of producing boron fluoride which comprises heating a mixture of boric oxide and calcium fluoride in a molar ratio of $B_2O_3:CaF_2$ of about 1.3 to a temperature in the range of about 900 to about 1200° C.

EMILE L. BALDESCHWIELER.